United States Patent
Niinivaara et al.

(10) Patent No.: US 6,408,944 B1
(45) Date of Patent: Jun. 25, 2002

(54) APPARATUS AND METHOD TO SHUT DOWN A PIPELINE

(75) Inventors: Juhani Niinivaara; Tarmo Niinivaara, both of Koria; Tero Hurtta, Helsinki, all of (FI)

(73) Assignee: AB Grundstenen (Metal Patent WHSS AB), Haparanda (SE)

( * ) Notice: Subject to any disclaimer, the term of this patent is extended or adjusted under 35 U.S.C. 154(b) by 0 days.

(21) Appl. No.: 09/582,462

(22) PCT Filed: Dec. 30, 1998

(86) PCT No.: PCT/FI98/01029

§ 371 (c)(1),
(2), (4) Date: Aug. 17, 2000

(87) PCT Pub. No.: WO99/37883

PCT Pub. Date: Jul. 29, 1999

(30) Foreign Application Priority Data

Dec. 30, 1997 (FI) .................................................. 974647

(51) Int. Cl.[7] .............................................. E21B 29/00
(52) U.S. Cl. ........................ 166/298; 166/55; 166/90.1
(58) Field of Search ........................ 166/298, 55, 90.1, 166/95.1, 97.1, 285; 169/69

(56) References Cited

U.S. PATENT DOCUMENTS 2,840,166 A * 6/1958 Eckel et al.
3,993,137 A * 11/1976 Hefetz .......................... 169/69
5,161,617 A 11/1992 Marschke
6,125,928 A * 10/2000 Niinivaara et al. ............ 166/55

FOREIGN PATENT DOCUMENTS

| DE | 4116473 | 11/1992 |
|---|---|---|
| WO | 98/27312 | 6/1998 |

* cited by examiner

Primary Examiner—William Neuder
(74) Attorney, Agent, or Firm—Banner & Witcoff, Ltd.

(57) ABSTRACT

For an apparatus and method to shut down pipelines, an apparatus frame is supported by the pipe to be shut down, and includes a pointed drill and a drill cylinder to drill a hole, essentially similar in diameter size with the plug cylinder or, when in the same temperature, essentially smaller in diameter size than the plug cylinder, through the pipe to be shut down. The apparatus includes a plug cylinder and equipment for installing the plug cylinder in the drill hole. There is a channel inside the drill cylinder and/or plug cylinder and/or shaft to feed a coolant, a flowing substance, preferably hydrogen, carbonic acid, or other such substance, cooling and at the same time reducing the size of the plug cylinder until it is inserted in the drilled hole. After the plug cylinder has been inserted, the flow of the coolant stops. As a result, the temperature of the plug cylinder increases, and the size of the plug cylinder increases as well. Thus, the seal created by the plug cylinder in the drilled hole is fortified.

11 Claims, 1 Drawing Sheet

APPARATUS AND METHOD TO SHUT DOWN A PIPELINE

FIELD OF THE INVENTION

The present invention relates to a novel apparatus and method to shut down pipelines. With the help of the invention, a massively leaking pipeline, generally a gas and/or oil drilling pipe, sewer, process industry pipe, or natural gas pipe or other such pipe is shut down in a manner which guarantees a tight plugging.

DESCRIPTION OF THE RELATED ART

In the methods known, the pipeline is shut down by drilling a hole through the pipe from the side, installing a plug in the hole; or, normally, the valves at the end(s) of the pipe or elsewhere in the pipe are closed. The factors of uncertainty in the functioning of such a method to shut down a pipe are the breaking of the valve in case of a disaster or poor durability of the seam of the plug due to the prevalence of long-term stress, in general pressure, impact pressure, or other such stress.

SUMMARY OF THE INVENTION

With the help of the invention, the plugging of a pipeline to be shut down and mainly the seam between the plug and the pipeline can be sealed effectively. The seam in question can be made tight when the diameter of the hole to be drilled through is as close to the same size as possible with the diameter of the plug to be installed. According to this invention, this aim can be achieved in the following manner: from the start of the plugging process, i.e., drilling, a coolant, preferably liquid nitrogen, carbonic acid, or other such substance, is fed through parts of the apparatus, such as the drill and/or plug cylinder or a combination thereof, into the pipeline always essentially to the point where the plug cylinder has advanced to the determined depth and been installed in place. The cool liquid, or the gas evaporating from it, cools the parts being drilled through whereupon the holes drilled into the pipeline are smaller than those drilled without cooling. After stopping the feeding of the coolant, the plug cylinders located in the drilling seams expand as a result of an elevation in the temperature, especially in gas and/or oil drilling pipes or in pipes used in process industry, thereby forming a tight plug in the drilling seam created by the drill penetrating the pipeline. At the same time, the coolant suppresses any possible oil or gas fire, etc. when gushing out of the leakage point in the pipeline, i.e., the fire pocket. After the apparatus has performed the shutting down of the pipe, the channel inside the plug cylinder can be filled with a material freely expanding the air, preferably with polyurethane or any other such material, in order to increase the sealing capacity of the plug. To stop a massive oil leak in two or more nested gas and/or oil drilling pipes, the embodiment of the apparatus and method used is as follows: the shutting down is started from the innermost pipe with the smallest diameter and thickest wall, thereafter advancing to a bigger pipe with the diameter next in size and so on. The pipe with the smallest diameter is shut down at a lower point than the bigger pipe next in size, and so on. This order from the bottom upwards and from the smallest one to a bigger one produces tight plugs and durable seams due to the following:

1. The pipe with the smallest diameter reaches deepest down into the ground whereupon the oil coming from there discharges with the highest pressure and is a thicker and stiffer liquid. If this liquid discharges into the flow space of the pipes with a larger diameter and thinner walls, the walls of the pipes in questions cannot resist this pressure—at least not after the said pipe is shut down—and they break.

2. If a pipe with a larger diameter is shut down by drilling a hole through it when a pipe/pipes smaller than it is/are not yet shut down, the bottom ends of the pipes with a smaller diameter below it come loose and fall off their place. Once again, there will be a massive oil leak from the flow space of the pipe(s) with a smaller diameter into the flow space of the bigger pipe and the walls of the pipe in question break.

BRIEF DESCRIPTION OF THE DRAWINGS

The following explains the invention in more detail with references to the appended diagram.

DETAILED DESCRIPTION OF A PREFERRED EMBODIMENT

Figure 1:
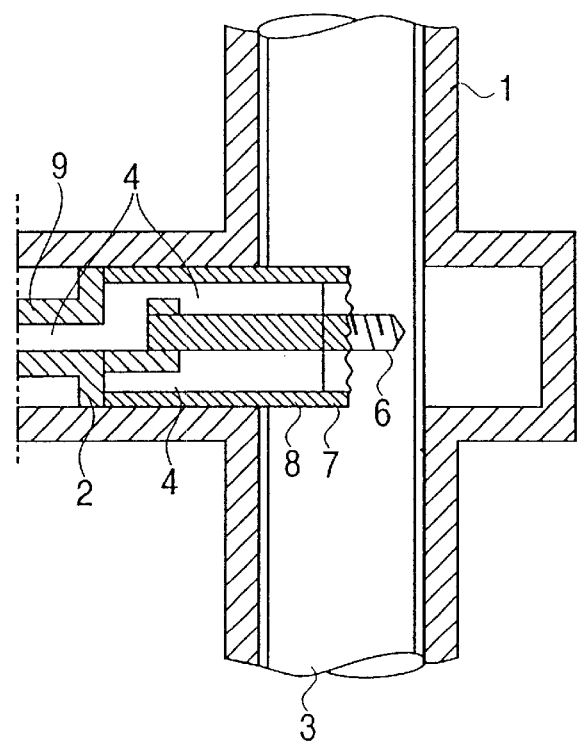
FIG. 1 shows those parts, forms, and details of the apparatus for performing the plugging process which are strategically important in producing a tight plug.
Figure 2:
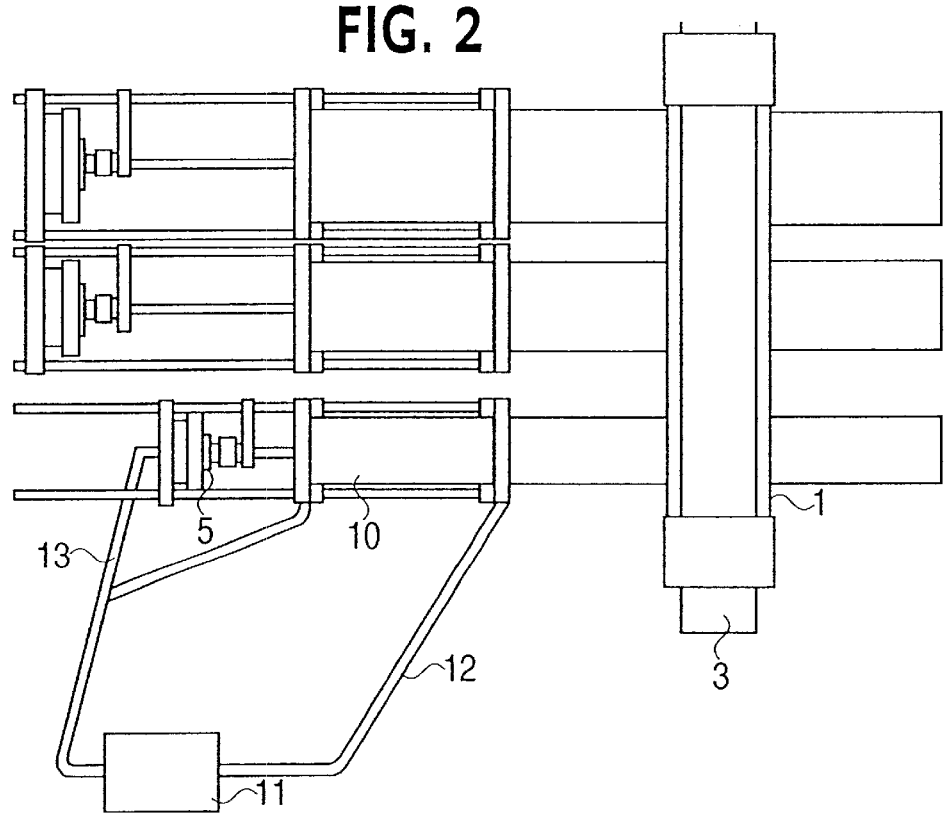
FIG. 2 shows a partially sectioned application for performing a plugging of a combination of three nested oil and/or gas drilling pipes, or of other pipelines. The invention is not limited to the plugging of only one or three nested pipelines.

In reference to FIG. 1, when the operation of the apparatus is started, the drill (2), supported by the frame (1) connected around the pipeline (3), sinks into the surface of the pipeline (3) and on through it, at the same time gathering the loose pieces of the drilled pipeline (3) around the pointed drill (6) at the point. Concurrently, upon starting the drilling process, the feeding of a cool liquid, preferably liquid nitrogen, carbonic acid, or other such substance, into the pipeline (3) through the cooling channel located in the shaft (9) of the drill and/or in the drill cylinder (7) and/or in the plug cylinder (8), or in a combination thereof, is started. The cooling liquid, or the gas evaporating from it, cools the parts being drilled, especially in case the cooling channel (4) is located near the external surface of the drill cylinder (7) and/or plug cylinder (8), or a combination thereof in which case the holes drilled in the pipeline (3) are smaller than those drilled without cooling. The feeding of the coolant is stopped, after the drill cylinder (7) has penetrated, or almost penetrated, the pipeline (3) at which point the plug cylinder (8) expands as a result of an increase in the temperature, thereby forming a tight plug in the drilling seam created by the drill penetrating the pipeline (3). Power for the apparatus is supplied by a battery, accumulator, electrical power network, or other such device through power equipment (5) and/or hydraulic equipment (10). The operation of the apparatus is monitored with various measuring devices and transducers or by comparing the differences between several electromagnetic fields and the data so derived, gathered into a computer, are arranged to be integrated with the coded limiting values which control the operation of the apparatus and to be further transferred into the monitor/control terminal.

In an exemplary embodiment of the apparatus and method to shut down pipelines (3), the apparatus includes a frame (1) that is supported by the pipe (3) to be shut down. The apparatus is connected to the frame (1), and is hydraulically and/or electronically rotated, movable crosswise in relation to the longitudinal direction of the pipe to be shut down. The apparatus further includes a pointed drill (6) and a drill cylinder (7) to drill a hole, essentially similar in diameter size with the plug cylinder (8) or, when in the same temperature, essentially smaller in diameter size than the plug cylinder (8), through the pipe to be shut down. The apparatus includes a plug cylinder (8) and equipment for installing the plug cylinder (8) in the drill hole. There is a channel (4) inside the drill cylinder (7) and/or plug cylinder (8) and/or shaft (9) to feed a coolant, a flowing substance, preferably hydrogen, carbonic acid, or other such substance, cooling and at the same time shrinking the surroundings, which, under right conditions, vaporizes from solid and/or liquid state to be fed from the reservoir (11) through the pipe(s) (12) and/or (13).

Furthermore, the drilling equipment (2), the pointed drill (6), the drill cylinder (7), the plug cylinder (8), and the shaft (9) get their power from a battery, accumulator, electrical power network, or other such device through power equipment (5) and/or hydraulic equipment, mainly a piston and a cylinder (10), The coolant that flows through the apparatus is conducted from a reservoir (11) through a pipe (12) to the drilling equipment (2); and/or along a pipe (13), through power equipment (5), preferably through the shafts, and/or hydraulic equipment (10), preferably through the shafts, and on into the drilling equipment (2).

Further still, the drill cylinder (7) and plug cylinder (8), in relation to each other, are located either on the same side or on the opposite sides of the pipelines.

The outside diameter of the drill cylinder (7) and the plug cylinder (8), or a combination thereof is larger than the inside diameter of the pipeline (3) to be shut down and smaller than the outside diameter of the pipeline (3) to be shut down.

Operation of the apparatus is monitored with various measuring devices and transducers or by comparing the differences between several electromagnetic fields and the data so derived, gathered into a computer, are arranged to be integrated with the coded limiting values which control the operation of the apparatus and to be further transferred to the monitor/control terminal.

After the plug cylinder (8) has shut down the pipe, the channel (4) inside the plug cylinder (8) can be filled with a material freely expanding in the air, preferably with polyurethane or any other such material, in order to increase the sealing capacity of the plug.

The exemplary embodiment of the present invention may be utilized when shutting down nested oil and/or gas drilling pipes, and the order for shutting down the pipes starts from the pipe with the smallest diameter proceeding to the next pipe larger in diameter. Furthermore, when shutting down nested oil and/or gas drilling pipes, the order to shut down the pipes is from the bottom to the top.

Lastly, in the two adjacently close consecutive drilling and plugging mechanisms, the drilling directions of the drill cylinders (7) through the pipe are essentially opposite directions, and in each of the two adjacently successive drilling and plugging mechanisms, the plugging directions of the plug cylinders (8) are essentially opposite directions.

What is claimed is:

1. A method of shutting down leaking oil or gas pipelines said method comprising the steps of:

placing a frame around the leaking pipeline, said frame comprising drilling equipment having a rotatable drill and a rotatable drill cylinder which are moveable transversally in relation to the direction of the pipeline;

boring a hole through the pipeline using the drill cylinder of drilling equipment;

inserting a plug cylinder in the bore to seal the pipeline to thereby shut off the pipeline;

simultaneous with said steps of boring a hole and inserting the plug cylinder, feeding a coolant through a channel inside the plug cylinder to cool the plug cylinder; and ceasing the feeding of coolant through the channel enabling the plug cylinder to expand as a result of an elevation in the temperature for sealing the pipe in a tight manner.

2. A method according to claim 1, wherein the coolant is a liquid.

3. A method according to claim 2, wherein the liquid coolant is nitrogen or carbonic acid.

4. A method according to claim 1, wherein when shutting down nested pipelines, said method includes arranging a series of frames corresponding to the number of the nested pipes in the leaking pipeline along the pipeline in which the pipeline is shut off starting from the pipe having the smallest diameter.

5. A method according to claim 4, wherein the pipes are shut off from the bottom to the top.

6. An apparatus for shutting down leaking oil or gas pipelines, comprising:

a frame mountable on a support of a pipe to be shut down, the frame comprising:

drilling equipment having a pointed rotatable drill, and a drill cylinder for boring a hole through the pipe, the pointed drill and drill cylinder being arranged on the frame to move transversally in relation to the longitudinal direction of the pipeline, a plugging cylinder for plugging the hole bored through the pipe, the plugging cylinder being arranged on the frame to move transversally in relation to the longitudinal direction of the pipeline, and means for moving the plugging cylinder into a plugging position in the hole bored through the pipeline, wherein inside the plugging cylinder there is provided a channel for passing a coolant through the plugging cylinder during its insertion into a plugging position in the hole bored through the pipeline.

7. An apparatus according to claim 6, wherein the plugging cylinder, the pointed rotatable drill and the drill cylinder are carried by a common rotatable shaft operative transversally in relation to the longitudinal direction of the pipeline and carried on said shaft, said parts forming a series of adjacent successive operatives.

8. An apparatus according to claim 7, wherein the plugging cylinder, the pointed rotatable drill and the drill cylinder are forming parts of a single common means.

9. An apparatus according to claim 7, wherein the shaft is provided with a channel for feeding coolant to the channel passing through the plugging cylinder.

10. An apparatus according to claim 8, wherein the drill cylinder is provided with a channel for passing coolant through the drill cylinder during the boring operation through the pipeline.

11. An apparatus according to claim 6, wherein the coolant is conducted from a reservoir through pipes to the drilling equipment.

* * * * *